United States Patent [19]

Hesse et al.

[11] Patent Number: 5,478,908
[45] Date of Patent: Dec. 26, 1995

[54] LOW-CONTAMINANT RESOLS FOR CEMENTS

[75] Inventors: Wolfgang Hesse, Taunusstein; Klaus Rauhut, Wiesbaden, both of Germany

[73] Assignee: Hoechst Aktiengesellschaft, Germany

[21] Appl. No.: 340,027

[22] Filed: Nov. 14, 1994

[30] Foreign Application Priority Data

Nov. 13, 1993 [DE] Germany .......................... 34 38 835.3

[51] Int. Cl.[6] .............................. C08G 8/04; C08G 14/04
[52] U.S. Cl. ........................... 528/155; 528/129; 528/153; 523/400; 523/424
[58] Field of Search ................................ 528/129, 153, 528/155; 523/400, 424

[56] References Cited

U.S. PATENT DOCUMENTS 4,302,380  11/1981  Hesse et al. ............................ 523/400
4,596,840   6/1986  Hesse et al. ............................ 523/400

Primary Examiner—James J. Seidleck
Assistant Examiner—Richard Jones
Attorney, Agent, or Firm—Bierman and Muserlian

[57] ABSTRACT

Resols which are suitable for use as binders for cements, laminates, impregnations and abrasives having low after-shrinkage have a free phenol content of less than 5% by weight and are in the form of mixed condensates of trifunctional phenols with respect to formaldehyde and alkylidenepolyphenols in a molar ratio of phenolic hydroxyl groups in the trifunctional phenols to hydroxyl groups in the alkylidenepolyphenols of 9:1 to 3:7 with formaldehyde in a molar ratio of the sum of phenolic hydroxyl groups to formaldehyde of 1:1.2 to 1:2.0.

12 Claims, No Drawings

LOW-CONTAMINANT RESOLS FOR CEMENTS

The invention relates to low-contaminant resols which, while having good solvent resistance and a low phenol content, can be used in cements having low after-shrinkage, to the preparation of such resols and to their use for cements, laminates, impregnations and abrasives.

U.S. Pat. No. 4,596,840 discloses resols for cements having low after-shrinkage. However, cement solutions prepared from these resols have a phenol content between 7 and 10% by weight.

The free phenol content in the known resol-containing resin solutions provides valuable application properties. In cements, it affects in particular after-shrinkage. On the other hand, the phenol content of preparations is regulated by law. Preparations having a phenol content above 5% by weight must be labeled as "toxic", that is, they must be treated as industrial toxic substances. For reasons of occupational hygiene, it is therefore important to limit the maximum phenol content in this preparation to values below the toxicity limit of 5% by weight.

As is known, the free phenol content in a resol depends very greatly on the level of formaldehyde (relative to the phenol portion), during preparation. Accordingly, one way of obtaining resols having a phenol content below 5% by weight is to increase the level of formaldehyde. However, if these resols are synthesized using different levels of formaldehyde, resulting in different free phenol contents, the cements prepared therefrom are found to have sufficiently low after-shrinkage values only if the phenol content is clearly above 5% by weight (comparative experiments 2.1–2.4). U.S. Pat. No. 3,979,218 describes a process for preparing low-contaminant resols for cement solutions. To this end, phenols, alkylated phenols and formaldehyde are reacted and the phenolic hydroxyl groups thereof are then partially etherified. Cement solutions prepared from such resols have a low phenol content of, in some cases, even less than 1% by weight. However, owing to the alkyl ether groups incorporated, the cured products are naturally susceptible to organic solvents such as toluene and butene acetate and accordingly do not reach the resistance to chemicals of the non-etherified products.

The object of the present invention was therefore to provide solvent-resistant resols which have a free phenol content of less than 5% by weight and are suitable for preparing cements having a low after-shrinkage.

According to the invention, the object is achieved by resols obtained by mixed condensation of formaldehyde, trifunctional phenols with respect to formaldehyde and alkylidenepolyphenols in a molar ratio of phenolic hydroxyl groups in the trifunctional phenols to phenolic hydroxyl groups in the alkylidenepolyphenols of 9:1 to 3:7 and a molar ratio of the sum of phenolic hydroxyl groups to formaldehyde of 1:1.2 to 1:2.

Accordingly, the invention relates to resols which are suitable for use as binders for cements, laminates, impregnations and abrasives having low after-shrinkage and have a free phenol content of less than 5% by weight, preferably less than 4% by weight, in particular less than 3% by weight, and are in the form of mixed condensates of trifunctional phenols with respect to formaldehyde alkylidenepolyphenols in a molar ratio of phenolic hydroxyl groups in the trifunctional phenols to hydroxyl groups in the alkylidenepolyphenols of 9:1 to 3:7, preferably 7:1 to 3:5, in particular 5:1 to 2:3, with formaldehyde in a molar ratio of the sum of phenolic hydroxyl groups to formaldehyde of 1:1.2 to 1:2.0, preferably 1:1 to 1:1.8.

As used therein, trifunctional phenols with respect to formaldehyde are phenols in which both o positions and the p position relative to the phenolic hydroxyl group are unsubstituted and reactive.

The most suitable trifunctional phenol with respect to formaldehyde is phenol itself. However, it is also possible to use alkylphenols, for example m-cresol, m-ethylphenol. The trifunctional phenols can be used individually or else in a mixture.

In addition to these trifunctional phenols, small amounts, preferably up to 10 mol %, in particular up to 5 mol %, relative to the amount of trifunctional phenols, of other substituted bi- or mono-functional phenols with respect to formaldehyde, for example o-, p-cresol, can also be used.

Alkylidenepolyphenols are compounds in which at least two phenol radicals bridged by an alkylidene radical are present. Examples of compounds which serve as alkylidenepolyphenols are novolaks obtained from phenol and oxo compounds. The number-average molecular weight of these novolaks is preferably between 200 and 1000, in particular between 400 and 750. Apart from the phenol used for preparing the novolaks, small amounts of substituted phenols can also be present. Examples of suitable oxo compounds for preparing novolaks are acetaldehyde, propionaldehyde, butyraldehyde, iso-butyraldehyde or higher aldehydes having up to 10 carbon atoms, but preferably formaldehyde. Mixtures of novolak obtained from different oxo compounds can also be used.

Useful alkylidenepolyphenols are also bisphenols linked by methylene, ethylidene, propylidene, iso-propylidene, butylidene or iso-butylidene bridges or mixtures thereof.

These alkylidenebisphenols can also carry alkyl substituents preferably having 1 to 4 carbon atoms. Particular preference is given to the use of 2,2-diphenylolpropane, which is a bisphenol linked by an iso-propylidene bridge.

In order to bind excess formaldehyde, the resols according to the invention can contain formaldehyde scavengers in amounts of up to 10% by weight, preferably of up to 5% by weight. Compounds which are suitable for this purpose are basically any substances which react spontaneously with formaldehyde, for example dicyandiamide, melamine, urea, ethyleneurea and other cyclic urea derivatives, guanidine, benzoguanamines and other compounds which form aminoplastic resins.

The present invention also provides a process for preparing the resols according to the invention. Preparation of the resols takes place in homogeneous phase under the conditions customary in phenolic resin technology at temperatures between 20° and 100° C., preferably 40° and 80° C.

Preferably, basic catalysts, for example amines, alkaline earth metal oxides, alkaline earth metal hydroxides or alkali metal hydroxides, in particular sodium hydroxide, are added to the reaction mixture. After the reaction is complete, the catalysts are preferably neutralized by addition of acid.

The time of addition of the alkylidenepolyphenol is essential to the process according to the invention. Premature addition leads to resins having a very high phenol content (Comparative Example 3). On the other hand, addition of the alkylidenepolyphenol must not take place too late since otherwise the viscosity, the water compatibility and other important application properties will be adversely affected. Therefore it is necessary to closely monitor the course of the reaction by measuring the viscosity and the formaldehyde content. An optimum mode of operation is first to charge the reaction vessel with the trifunctional phenols and, if desired, the mono- and bifunctional phenols together with the total amount of formaldehyde and the catalyst and to allow the reaction to proceed until 50 to 90%, preferably 60 to 90%, of the formaldehyde used has been reacted. The alkylidenepolyphenols are then added, and the reaction is continued until reaching the desired end point, which is usually determined by measuring the viscosity.

In order to reduce the formaldehyde content in the resol, a formaldehyde scavenger can be added after the reaction is complete.

The invention also relates to the use of the resols according to the invention as binders for cement resins, laminating resins and impregnating resins for porous molded articles or else as binders for sheet-like abrasives.

Especially when cements are prepared, suitable fillers, preferably graphite powder, coke powder, are usually added to the resols. With the resols according to the invention, other additives which otherwise are customary in cements, such as epoxy compounds, chloroalkanes and furane derivatives can be omitted. However, if required, the additives mentioned can also be used. In addition, organic solvents can also be added to the resols according to the invention. Of these, those which are not toxic, for example acetone, are preferred.

When the resols according to the invention are employed for impregnations and abrasives, curing of the resols preferably takes place by heating. In order to achieve good curing of the resols in cements and laminates, in particular when used at low temperatures, it is usually necessary to add strong inorganic or organic acids, such as sulfonic acids, as catalysts. Advantageously, sulfonyl chlorides can also be used or included as latent acids. A detailed description of the preparation of cements and methods for testing them are described in the publications EP-A 0,158,871 and U.S. Pat. No. 3,977,218 mentioned at the beginning.

The cements obtained from resol resins according to the invention possess all necessary properties of conventional cements and, in addition thereto, have, in accordance with the invention, the advantage of a low phenol content and furthermore good resistance to chemicals.

The invention is described in more detail by the examples which follow. Parts and percentages are by weight unless stated otherwise.

EXAMPLE 1

The glass reaction vessel is equipped with stirrer, thermometer, heating and cooling.

282 parts of phenol are melted, and 30.3 parts of 33% sodium hydroxide solution are added, and the resulting mixture is heated to 60° C. This is followed by first adding 121.5 parts of an aqueous 37% formaldehyde solution and 173.3 parts of 91% paraformaldehyde over a period of one hour and stirring the mixture at 60° C. until, two hours after addition of the formaldehyde is complete, the formaldehyde content reached in the reaction batch is 7.12%, which corresponds to a formaldehyde consumption of 72%. At this point, the reaction solution has a viscosity of 137 mPa.s (23° C.), an evaporation residue (1 h/135°C.) of 71% and unlimited water compatibility. 228 parts of 2,2-diphenylolpropane are then added to the batch, and the resulting mixture is stirred until after 150 minutes a viscosity of 160 mPa.s (23° C.) is reached. At this point, the reaction mixture contains 1.7% of unreacted formaldehyde, an evaporation residue of 79.6% (1 h/135° C.) and a water compatibility of 1:1.6 (23° C.) and 3.8% of free phenol. Taking into consideration the samples taken, the yield corresponds to that of the substance used.

EXAMPLE 2

329 parts of phenol are melted in the apparatus of Example 1, 60.5 parts of 33% sodium hydroxide solution are added followed by addition of 121.5 parts of an aqueous 37% formaldehyde solution and 231 parts of 91% paraformaldehyde at 60° C. Three hours after addition of formaldehyde is complete, 90% of the formaldehyde used has been consumed at a formaldehyde content of 3.4%. The reaction mixture has a viscosity of 344 mPa.s at an evaporation residue of 71.3% (1 h/135° C.) and is water-miscible in any ratio. 171 parts of 2,2-diphenylolpropane are then added, and stirring of the resulting mixture at 60° C. is continued until after a reaction time of 80 minutes a viscosity of 1135 mPa.s (23° C.) is reached. At this point, the resin has a formaldehyde content of 1.7%, an evaporation residue of 751.1% (1 h/135° C.) and is water-compatible in a ratio of 1:1.95. The unreacted phenol content is 1.7%. The batch is allowed to continue the reaction until after another hour at 60° C. a viscosity of 1600 mPa.s (23° C.) is reached. During this period, the free formaldehyde content drops to 1.3%, while the water compatibility remains virtually unchanged at 1:2. The free phenol content is 1.6%. 10 parts of urea are then added per 300 parts of resin and the batch is stirred at 60° C. for another hour and then cooled. At an unchanged phenol content of 1.6%, the unreacted formaldehyde content is 0.4%, the viscosity is 1820 mPa.s and the water compatibility is 1:2.1.

EXAMPLE 3

In the apparatus according to Example 1, 30.34 parts of phenol, 3.25 parts of 33% sodium hydroxide solution, 23.97 parts of aqueous 37% formaldehyde solution and 13.79 parts of 91% paraformaldehyde are reacted at 60° C. until after 3 hours a formaldehyde content of 4.2% is reached. 24.53 parts of 2,2-diphenylolpropane are then added, and condensation is continued at 60° C. until after 7 hours a viscosity of 800 mPa.s (23° C.) is reached. 4.6 parts of urea are then added, the batch is maintained at 60° C. for another hour, cooled and removed from the reaction vessel. The resin has a viscosity of 750 mPa.s (23° C.), an evaporation residue of 70.5% (1 h/135° C.), a phenol content of 2.8%, a water compatibility at 23° C. of 1:0.9 and a formaldehyde content of 0.27%.

This resin is tested for use as a cement. To this end, 70 parts of the resin solution are mixed with a curing agent powder, a preparation of 50 parts of graphite powders. 44 parts of coke powder and 6 parts of benzenesulfonyl chloride. The maximum pot life of the mixture is 75 minutes at room temperature. The mixture then cures to give a solid cement material. After 24 hours, the surface hardness (Shore D) is 55 units, after 48 hours, it is 65 units. After 8 days of storage at room temperature, the modulus of elasticity of the cured cement mass is $0.715 \cdot 10^{-4}$ N·mm$^{-2}$.

The aftershrinkage of the cement is measured as follows:

Test specimen: a cylinder having a diameter of 2.5 cm and a length of 9.5 cm.

At both ends, measuring marks made of glass are attached. The total length of the test specimen, including measuring marks: about 10.5 cm.

Preparation of the test specimens: the cement is poured into a polyethylene form, and the cured cement cylinder is removed after 24 h.

Measurement: the first measurement (reference measurement) takes place immediately after the test specimen has been removed from the form and the measuring marks have been attached by means of a micrometer screw. The numbers given are a measure of the linear shrinkage, expressed in percent, relative to the original length of the test specimens at room temperature.
The aftershrinkage of the cured cement is:

| Time | Linear shrinkage |
|------|------------------|
| 8d   | 0.1368%          |
| 14d  | 0.1578%          |
| 21d  | 0.1824%          |
| 28d  | 0.2070%          |
| 50d  | 0.2140%          |

Test of the Stability of the Cement

The stability test is carried out in accordance with DECHEMA guidelines "Chemische Beständigkeit von Beschichtungs-, Verlege- und Verfugemassen" (Chemical stability of coating, laying and joint-filling compositions).

Test specimen: a cylinder having a diameter of 2.5 cm and a length of 2.5 cm.

Preparation of the test specimens: the cement is poured into a polyethylene form, and the cured cement cylinder is removed after 24 h.

Stability Test:

The stability test is carried out after storing the test specimens at room temperature for 8 days and soaking them in the relevant test liquid at room temperature. After a period of 1000 h, the test specimens are removed from the test liquid. They are then rated by the following criteria:

weight change in percent, relative to the weight before soaking visual inspection with respect to surface glass, color, cracking, swelling surface hardness in Shore D compared with the initial value before soaking compressive strength compared with the initial value before soaking Rating: for rating the cement as being resistant, the following criteria are used:
  surface unchanged
  weight change up to at most 2%
  reduction in compressive strength up to at most 10%.

The cements according to the invention are resistant to chloroform, 20% acetic acid, 20% hydrochloric acid, 20% sulfuric acid, toluene and distilled water. The test specimens have limited resistance to butyl acetate and 70% sulfuric acid. The test specimens are not resistant to acetone, bleaching liquor, 15% sodium hydroxide solution and 15% nitric acid. The resistances correspond to those of conventional phenol resin cements.

Comparative Experiment 1

Test of a conventional phenolic resin cement for use as cement.

A conventional phenolic resin cement solution, ®Asplit CN (Hoechst AG), having a free phenol content of 8.2%, a free formaldehyde content of 0.4% and a viscosity of 830 mPa.s at an evaporation residue of 72% (1 h/135° C.) is mixed with the cement powder described in Example 3, and the mixture is processed in the same manner to give a cement specimen. The aftershrinkage test gives the following values:

| Time | Linear shrinkage |
|------|------------------|
| 8d   | 0.1754%          |
| 14d  | 0.1894%          |
| 21d  | 0.2070%          |
| 28d  | 0.2140%          |
| 50d  | 0.2210%          |

The chemical resistance test gives the same values as in Example 3.

Comparative Experiments 2.1–2.4

To find out what effect the phenol/formaldehyde molar ratio and the unreacted phenol and formaldehyde content resulting therefrom have on aftershrinkage, conventional resols are prepared and tested for use as cement. The resols are prepared by the following procedure:

940 parts of phenol are melted in the apparatus from Example 1, 60.5 parts of 33% sodium hydroxide solution are added, and the mixture is reacted at 70° C. with aqueous formaldehyde and paraformaldehyde until a viscosity of 800 mPa.s (23° C.) is reached. The levels of aqueous formaldehyde, paraformaldehyde, and the properties and characteristic data obtained are shown in the table below:

| Experiment | 2.1 | 2.2 | 2.3 | 2.4 |
|------------|-----|-----|-----|-----|
| Phenol/formaldehyde molar ratio | 1:2.2 | 1:2.0 | 1:1.8 | 1:1.6 |
| Amount of 37% formaldehyde | 270 g | 270 g | 270 g | 270 g |
| Amount of 91% paraformaldehyde | 616 g | 550 g | 486 g | 412 g |
| Viscosity [mPa · s (23° C.)] | 780 | 840 | 800 | 780 |
| Evaporation residue (1 h/135° C.) | 72.2% | 74.3% | 74.4% | 73.9% |
| $H_2O$ compatibility (23° C.) | 1:1.6 | 1:1.2 | 1:0.9 | 1:0.6 |
| Residual $CH_2O$ content | 4.03% | 3.0% | 1.45% | 1.25% |
| Residual phenol content | 4.6% | 5.8% | 7.7% | 9.75% |

The test for use as cement shows that the chemical resistance of the cements is comparable to that listed in Example 3 and Comparative Experiment 1. The measurement of aftershrinkage gives the following values:

| | Linear shrinkage | | | |
|---|---|---|---|---|
| Time/experiment | 2.1 | 2.2 | 2.3 | 2.4 |
| 8d  | 0.1817% | 0.1800% | 0.1754% | 0.1447% |
| 14d | 0.2278% | 0.2103% | 0.1894% | 0.1052% |
| 21d | 0.2524% | 0.2424% | 0.2070% | 0.1298% |
| 28d | 0.3105% | 0.2929% | 0.2140% | 0.1538% |
| 50d | 0.3807% | 0.3456% | 0.2210% | 0.1859% |

Comparative Experiment 3

30.34 parts of phenol and 24.53 parts of 2,2-diphenylolpropane are melted in the apparatus from Example 1. 3.25 parts of sodium hydroxide solution are added and the mixture is reacted with 23.97 parts of aqueous 37% formaldehyde solution and 13.97 parts of 91% paraformaldehyde as in Example 3. After addition of the formaldehyde, the reaction is carried out first at 60° C. for 3 hours until a viscosity of 207 mPa.s is reached. Since the reaction rate at this temperature is too slow, the condensation is then carried out at 70° C. for 6 hours until a viscosity of 850 mPa.s is reached and is then stopped. The formaldehyde content is 1.13% and the water compatibility at 23° C. is 1:1.7%. The free phenol content is 11.3%.

What is claimed is:

1. A resol for cements, laminates, impregnations and abrasives having low aftershrinkage having a free phenol content of less than 5% by weight and being in the form of mixed condensates of at least one trifunctional phenol with respect to formaldehyde and alkylidenepolyphenols in a molar ratio of phenolic hydroxyl groups in the trifunctional phenols to hydroxyl groups in the alkylidenepolyphenols of 9:1 to 3:7 with formaldehyde in a molar ratio of the sum of phenolic hydroxyl groups to formaldehyde of 1:1.2 to 1:2.0.

2. A resol as claimed in claim 1, wherein the trifunctional phenol is phenol.

3. A resol as claimed in claim 1, wherein the alkylidenepolyphenols are novolaks obtained from phenol and formaldehyde, the number-average molecular weight of which is between 200 and 1000.

4. A resol as claimed in claim 1, wherein the alkylidenepolyphenols are bisphenols containing methylene, ethylidene, propylidene, iso-propylidene, butylidene or iso-butylidene bridges.

5. A resol as claimed in claim 1, wherein the resol contains formaldehyde scavengers.

6. A process for preparing a resol as claimed in claim 1 in the presence of a basic catalyst in a temperature range from 20° to 100° C., which comprises using the total amount of trifunctional phenols and of formaldehyde in a first step and continuing the reaction until a formaldehyde consumption of 50 to 90% of the formaldehyde used is reached and then adding the alkylidenepolyphenols and continuing the mixed condensation.

7. The process as claimed in claim 6, wherein a formaldehyde scavenger is added at the end of the mixed condensation.

8. The process as claimed in claim 6, wherein the catalyst is neutralized or partially neutralized after the reaction is complete.

9. A cement resin containing a resol of claim 1.

10. A laminating resin containing a resol of claim 1.

11. An impregnating resin for porous molded articles containing a resol of claim 1.

12. A binder for sheet-like abrasives containing a resol of claim 1.

* * * * *